United States Patent
Eguchi (10) Patent No.: US 8,527,968 B2
(45) Date of Patent: Sep. 3, 2013

(54) TRANSLATION DEVICE, TRANSLATION METHOD, AND STORAGE MEDIUM FOR PROGRAM

(75) Inventor: Jun Eguchi, Minato-ku (JP)

(73) Assignee: NEC Corporation, Tokyo (JP)

( * ) Notice: Subject to any disclaimer, the term of this patent is extended or adjusted under 35 U.S.C. 154(b) by 161 days.

(21) Appl. No.: 13/259,914

(22) PCT Filed: Mar. 26, 2010

(86) PCT No.: PCT/JP2010/055387
§ 371 (c)(1),
(2), (4) Date: Sep. 23, 2011

(87) PCT Pub. No.: WO2010/110430
PCT Pub. Date: Sep. 30, 2010

(65) Prior Publication Data
US 2012/0017202 A1    Jan. 19, 2012

(30) Foreign Application Priority Data
Mar. 26, 2009    (JP) .................................. 2009-075783

(51) Int. Cl.
*G06F 9/45*    (2006.01)
(52) U.S. Cl.
USPC ........................................................ 717/137
(58) Field of Classification Search
USPC ........................................................ 717/137
See application file for complete search history.

(56) References Cited

U.S. PATENT DOCUMENTS

| 7,386,840 B1 * | 6/2008 | Cockerham et al. | ............ 717/137 |
| 2006/0031820 A1 * | 2/2006 | Li | ................................. 717/137 |
| 2012/0151437 A1 * | 6/2012 | Kneisel et al. | ................. 717/114 |

FOREIGN PATENT DOCUMENTS

| JP | 2001-005674 A | 1/2001 |
| JP | 2006-031173 A | 2/2006 |
| WO | 2010110430 A1 | 9/2010 |

OTHER PUBLICATIONS

Mattias, Michael; "COBOL Data Coversions"; IEEE; Sep. 1999.*
Borck, James; "Legacy application transformation"; JavaWorld; Aug. 8, 2000.*
Durand, Didier; "Project NACA: migration from an IBM mainframe to Intel/Linux servers—rationale and strategy"; media-tech blogspot; Jan. 15, 2009.*
K. Maehashi, C Programmer No tameno Java Q & A, Java World, Dec. 1, 2002, pp. 230-232, vol. 6, No. 12.

* cited by examiner

*Primary Examiner* — Wei Zhen
*Assistant Examiner* — Clint Thatcher
(74) *Attorney, Agent, or Firm* — Sughrue Mion, PLLC (57) ABSTRACT

A declaration translation unit (104) compiles a declaration of variables in overlapping storage areas in a first language to a declaration of independent data variables and respective corresponding flag variables in a second language; an assignment translation unit (105) compiles an assignment to the variables in the areas in the first language so that, in the second language, whether or not the values of the variables are valid is checked assuming that the assignment to the respective overlapping data variables is performed, the results are saved in flag variables for respective variables, and the assignment is performed only to valid data variables; and a reference translation unit (106) compiles the reference of the variables in the areas in the first language so that, in the second language, if the flag variable is valid, the value of the data variable is returned, and if invalid, an exception is occurred.

6 Claims, 3 Drawing Sheets

TRANSLATION DEVICE, TRANSLATION METHOD, AND STORAGE MEDIUM FOR PROGRAM

TECHNICAL FIELD

The present invention relates to a translation device, translation method, and storage medium suitable for translating a program described in a first programming language that can describe overlapping storage areas for retaining variables into a program described in a second programming language while resolving the overlapping variable storage areas.

BACKGROUND ART

In the industrial world, various sorts of programming languages are used. Many programs are assured their operational stability to some extent as the programs have been used over the years.

Among such programs, there are a great number of programs described in programming languages that were created in an era when restrictions to storage areas were severe. Many of these programming languages, to save storage areas and to convert some variable types, allow a description in which a certain variable and another variable are overlappingly stored in the same storage area.

In C language, for example, a description for declaring union such as the one below is used to overlappingly allocate an integer that represents a dominical year and a character array that represents the dominical year as a character string to a memory implemented by RAM (Random Access Memory):

union {int i; char s[5];} y;

A variable y is for storing a year. This description is expected to allocate an integer variable y.i and a character array variable y.s to an overlapping area and store a dominical year as an integer value in y.i and as a character string value in y.s.

If this program is created for 16-bit CPU (Central Processing Unit), the integer int i is generally expressed by 16 bits, that is, 2 bytes, while the character array char s[5] is expressed by 5 bytes. In this case, the integer variable y.i is allocated to the storage area by overlapping with the first 2 bytes, y.s[0], y.s[1], of the character array variable y.s.

Suppose little endian is adopted for the byte sequence. To assign an integer value as a dominical year, the following equation is executed:

y.i=2009;

Here, as the following equation is true:

2009=217+7×256, by executing the above assignment of the integer value, y.s[0] becomes 217, and y.s[1] becomes 7.

Meanwhile, C language adopts ASCIIZ format for character strings, which uses value 0 as a terminal character. For this reason, especially when an ASCIIZ character string with length 0 or 1 is written by equations like:

strcpy(y.s, "");

or strcpy(y.s, "a");

before assigning the integer to y.i, the terminal character is overwritten by the assignment to y.i.

As the result, y.s becomes illegal as an ASCIIZ character string.

In addition, 7 is a character code of BEL in ASCII character, and 217 exceeds the scope of ASCII character and is a code of one-byte katakana 'ru', which is not a 'character string expressing a dominical year' intended by a programmer Further, while, if the following equation is executed:

strcpy (y.s, "2009");

the character array y.s is valid as an ASCIIZ character string and stores the value expected by the programmer, as '2' indicates character code 50 and '0' indicates character code 48, integer y.i has a value:

50+48×256=12338, which is not appropriate for a dominical year.

Other methods for expressing an integer includes: a method that utilizes a bit array itself and expresses an integer as one's compliment or two's compliment; a method that uses pack binary-coded decimal equation in which one decimal digit value (0-9) is stored in 1 nibble; and a method that uses a zoned binary coded decimal equation that expresses one decimal digit value (0-9) using a corresponding character code and can be interpreted both as an integer and as a character array.

For example, in COBOL language, unlike C language, 4-byte area is retained for four-digit zoned binary coded decimal by storing one digit in 1 byte, independently of the specifications and features of a CPU and the like.

In addition, REDEFINES clause is used to overlap a storage area for a variable of zoned binary coded decimal and a storage area for a character string variable.

Therefore, to describe the above C language program in COBOL language utilizing a declaration of redefined fields, the following description is used:

01 Y

02 YI PIC Z(4)

03 YY REDEFINES YI

04 YS PIC X(4)

In the COBOL language program in which such a declaration is added, if the following equation is executed:

MOVE 2009 TO YI, the character code of character '2' is allocated as the first character of a character array variable YS in the overlapping storage area; the character code of character '0' as the second character thereof; the character code of character '0' as the third character thereof; and the character code of character '9' as the fourth character thereof, respectively.

As the result, both the character array variable YS and integer variable YI have valid values in this case.

On the other hand, if a character array of length 4 'abcd' is assigned such as by:

MOVE 'abcd' TO YS, this character array cannot be interpreted as an integer. Thus, the value of the integer variable YI becomes invalid, and referring to the value of YI, an exception occurs.

Moreover, there have been used techniques that store such variable values into a database or retrieves the values from a database.

In a certain COBOL processing system, a number of programs run under the implementation in which, when storing variables into a database, only the variables declared at the beginning of redefined fields are written in, and, when retrieving variables from a database, only the variables declared at the beginning of redefined fields are read out, and, when the value of a variable is invalid, the value stored into/retrieved from the database is a NIL value.

Meanwhile, in the recent years, with decreased memory prices the advancement of computer performance, a variety of processings are being described in programming languages that do not have a feature for allocating multiple variables into overlapping storage areas. For example, the technique disclosed in Patent Literature 1 discloses a compilation technique for computerizing business processes using JAVA (registered trademark) language that does not have a feature like those described above.

PRIOR ART LITERATURE

Patent Literature

Patent Literature 1: Unexamined Japanese Patent Application KOKAI Publication No. 2006-031173

SUMMARY OF INVENTION

Problems to be Solved by the Invention

Therefore, to utilize the assets from the past, such as a program described in COBOL language, there may be a method for translating the program into JAVA (registered trademark) language. However, as described above, there is no such feature equivalent to union or redefined fields in JAVA (registered trademark) language. Thus, a new technique is required to translate these union and redefined fields.

Besides the above, to mitigate dependency to the specification of a CPU and the like, a technique for translating without using union is required even when translating into C language or C++ language.

The invention is to solve the above-described problems. The invention aims to provide a translation device, translation method, and storage medium suitable for translating a program described in a first programming language that can describe overlapping storage areas for retaining variables into a program described in a second programming language while resolving the overlapping variable storage areas.

Means for Solving the Problem

To achieve the above-described aim, the following invention will be disclosed in accordance with the principle of the invention.

The translation device according to a first aspect of the invention translates an untranslated program described in a first programming language into a translated program described in a second programming language, comprises a declaration translation unit, an assignment translation unit, and a reference translation unit, and is configured as follows:

That is, the declaration translation unit that translates a declaration that "a storage area for retaining a first untranslated variable and a storage area for retaining a second untranslated variable overlap" in the untranslated program into a declaration that "a first translated variable and a first translated flag corresponding to the first untranslated variable and a second translated variable, and a second translated flag corresponding to the second untranslated variable are retained in storage areas that do not mutually overlap" in the translated program.

Meanwhile, the assignment translation unit that translates text that "assigns a value to the first untranslated variable" in the untranslated program into text that "assigns the value to the first translated variable, writes information to be recorded in an overlapping storage area among the assigned value in a storage area corresponding to the overlapping storage area among the storage area for retaining the second translated variable, and writes in the second translated flag, whether or not the information recorded in the storage area for retaining the second translated variable is valid as a value of the second translated variable" in the translated program, and translates text that "assigns a value to the second untranslated variable" in the untranslated program into text that "assigns the value into the second translated variable, writes information to be recorded in the overlapping storage area among the assigned value in the storage area corresponding to the overlapping storage area among the storage area for retaining the first translated variable, and writes in the first translated flag, whether or not the information recorded in the storage area for retaining the first translated variable is valid as a value of the first translated variable" in the translated program.

Further, the reference translation unit that translates an equation that "refers to a value of the first untranslated variable" in the untranslated program into an equation that "determines whether or not the information recorded in the storage area for retaining the first translated variable is valid as a value of the first translated variable by referring to the first translated flag, and referring to the value of the first translated variable when determined as valid, and creating an exception when determined as invalid" in the translated program, and translates an equation that "refers to a value of the second untranslated variable" in the untranslated program into an equation that "determines whether or not the information recorded in the storage area for retaining the second translated variable is valid as a value of the second translated variable by referring to the second translated flag, and referring to the value of the second translated variable when determined as valid, and creating an exception when determined as invalid" in the translated program.

Also, the translation device of the invention further comprises a registration translation unit and a readout translation unit, and can be configured as follows:

That is, the registration translation unit that translates text that "registers a value of the first untranslated variable to a database" in the untranslated program into text that "determines whether or not information recorded in a storage area for retaining the first translated variable is valid as a value of the first translated variable by referring to the first translated flag, and registering the value of the first translated variable to the database when determined as valid, and registering a NIL value to the database when determined as invalid" in the translated program, and translates text that "registers a value of the second untranslated variable to the database" in the untranslated program into text that "determines whether or not the information recorded in a storage area for retaining the second translated variable is valid as a value of the second translated variable by referring to the second translated flag, and registering the value of the second translated variable to the database when determined as valid, and registering the NIL value to the database when determined as invalid" in the translated program.

Meanwhile, the readout translation unit that translates text that "assigns a value read out from a database into the first untranslated variable" in the untranslated program into text that "reads out a value from the database, writes that the information recorded in the storage area for retaining the first translated variable is invalid in the first translated flag when the read out value is the NIL value, writes that the information recorded in the storage area for retaining the first translated variable is valid in the first translated flag when the read out value is not the NIL value, and writes the read out value in the storage area for retaining the first translated variable" in the translated program, and translates text that "assigns a value read out from a database to the second untranslated variable" in the untranslated program into text that "reads out a value from the database, writing that the information recorded in a storage area for retaining the second translated variable is invalid in the second translated flag when the read value is the NIL value, writes that the information recorded in the storage area for retaining the second translated variable is valid in the second translated flag when the read value is not the NIL value, and writes the read out value in the storage area for retaining the second translated variable" in the translated program.

In the translation device of the invention, the first untranslated variable may be a zoned binary coded decimal; the second untranslated variable may be an integer other than the zoned binary coded decimal; the first translated variable may be an integer capable of expressing an integer domain which can include the first untranslated variable; and the second translated variable may be an integer capable of expressing an integer domain which can include the second untranslated variable.

Also, in the translation device of the invention, the first untranslated variable may be a zoned binary coded decimal; the second untranslated variable may be a character array; the first translated variable may be an integer capable of expressing an integer domain which can include the first untranslated variable; and the second translated variable may be a character array of the second untranslated variable.

The translation method according to another aspect of the invention is carried out by the translation device that translates an untranslated program described in a first programming language into a translated program described in a second programming language. The translation device comprises a declaration translation unit, an assignment translation unit, and a reference translation unit, and the translation method comprises a declaration translation step, an assignment translation step, and a reference translation step and is configured as follows:

That is, in the declaration translation step, the declaration translation unit translates a declaration that "a storage area for retaining a first untranslated variable and a storage area for retaining a second untranslated variable overlap" in the untranslated program into a declaration that "a first translated variable and a first translated flag corresponding to the first untranslated variable and a second translated variable and a second translated flag corresponding to the second untranslated variable are retained in storage areas that do not mutually overlap" in the translated program.

Meanwhile, in the assignment translation step, the assignment translation unit translates text that "assigns a value to the first untranslated variable" in the untranslated program into text that "assigns the value to the first translated variable, writes information to be recorded in an overlapping storage area among the assigned value in a storage area corresponding to the overlapping storage area among the storage area for retaining the second translated variable, writes in the second translated flag, whether or not the information recorded in the storage area for retaining the second translated variable is valid as a value of the second translated variable" in the translated program, and translates text that "assigns a value to the second untranslated variable" in the untranslated program into text that "assigns the value into the second translated variable, writes information to be recorded in the overlapping storage area among the assigned value in the storage area corresponding to the overlapping storage area among the storage area for retaining the first translated variable, and writes in the first translated flag, whether or not the information recorded in the storage area for retaining the first translated variable is valid as a value of the first translated variable" in the translated program.

Further, in the reference translation step, the reference translation unit translates an equation that "refers to a value of the first untranslated variable" in the untranslated program into an equation that "determines whether or not the information recorded in the storage area for retaining the first translated variable is valid as a value of the first translated variable by referring to the first translated flag, and referring to the value of the first translated variable when determined as valid, and creating an exception when determined as invalid" in the translated program and translates an equation that "refers to a value of the second untranslated variable" in the untranslated program into an equation that "determines whether or not the information recorded in the storage area for retaining the second translated variable is valid as a value of the second translated variable by referring to the second translated flag, and referring to the value of the second translated variable when determined as valid, and creating an exception when determined as invalid" in the translated program.

The computer-readable storage medium that records a program according to another aspect of the invention is configured to run the program so that the computer functions as the above-described translation device.

The program can be stored in a computer-readable storage medium, such as a compact disc, a flexible disc, a hard disc, a magnet-optical disc, a digital versatile disc, a magnetic tape, and a semiconductor memory.

The above-described program can be delivered/sold over a computer communication network, separately from the computer that runs the program. Also, the above-described storage medium can be delivered/sold separately from the computer.

Effect of the Invention

According to the invention, there can be provided a translation device, translation method, and storage medium suitable for translating a program described in a first programming language that can describe overlapping storage areas for retaining variables into a program described in a second programming language while resolving the overlapping variable storage areas.

BEST MODE FOR CARRYING OUT THE INVENTION

An embodiment of the invention will be described below. While the following embodiment describes compilation of COBOL language (the first programming language) program (the untranslated program) into JAVA (registered trademark)

language (the second programming language) program (the translated program) for ease of understanding, the scope of the invention of this application is not limited to this.

Thus, while those skilled in the art can adopt other embodiments by replacing each or all of these elements to equivalents, such embodiments are also included in the scope of the invention.

For example, the invention can be similarly applied to a case in which C language or C++ language is used as a programming language for describing the translated program without using union in the translated program.

Embodiment 1

Figure 1:
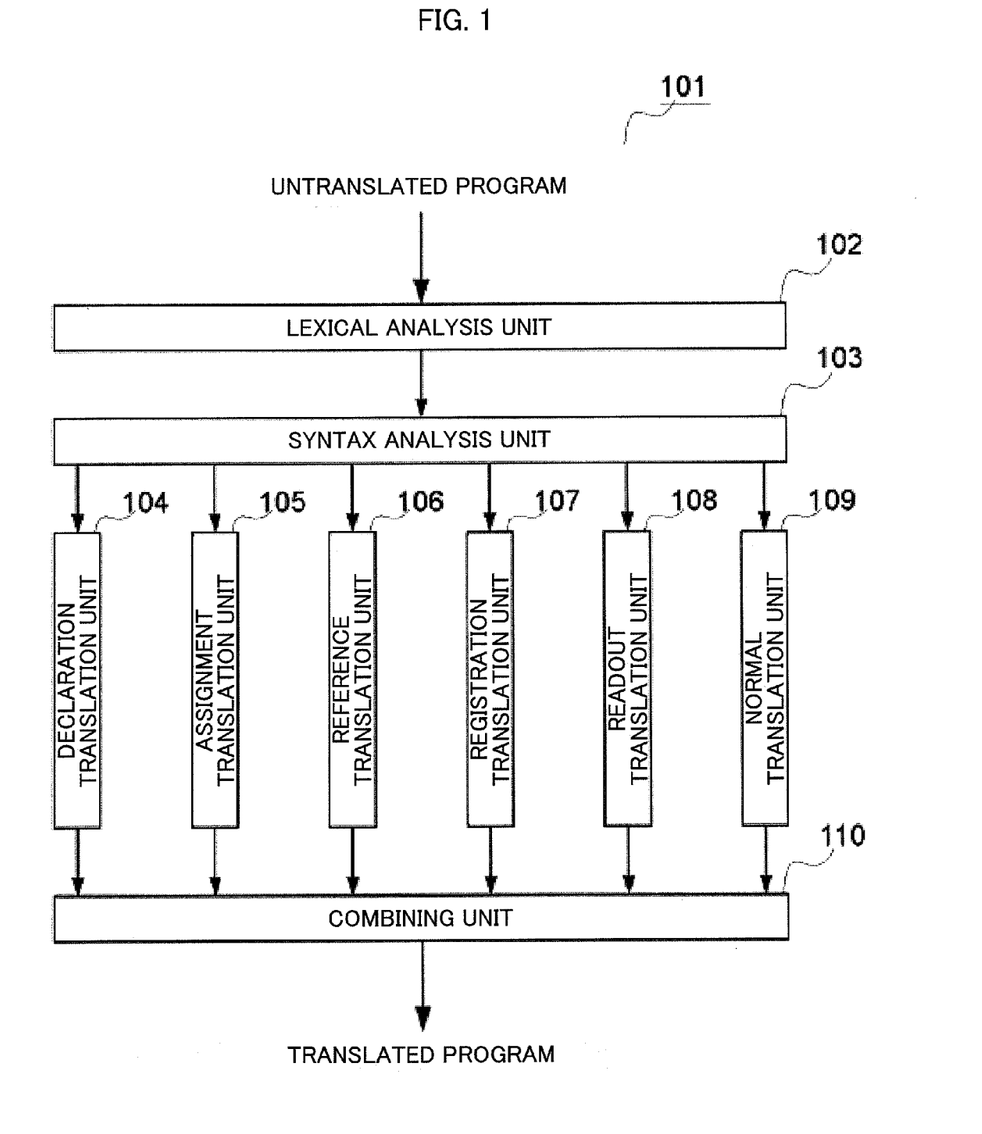
FIG. 1 is a view showing the frame format of the overall configuration of the translation device according to an embodiment of the invention.

FIG. 1 is a view showing the frame format of the overall configuration of the translation device according to an embodiment of the invention. The following will be described with reference to FIG. 1.

The translation device 101 shown in FIG. 1 is realized by running a compiler program in a computer. The computer reads out the compiler program on a RAM from a storage medium, such as a hard disc, and the CPU works with other functional components in the computer to run the compiler program.

For example, the untranslated program and the translated program are both recorded in a storage medium, such as a hard disc. Also, the RAM is used for recording temporary results of compilation processing and for other purposes.

As shown in FIG. 1, when the untranslated program is given to the translation device 101, a lexical analysis unit 102 performs a lexical analysis and converts the untranslated program into an array of characters including identifiers, operators, and reserved words.

Next, a syntax analysis unit 103 accepts the array of characters, performs a syntax analysis, and acquires text(s) comprised of the untranslated program.

These texts include the following kinds:
(1) A declaration text for causing overlapping of variable storage areas
(2) An assignment text for assigning values to variables in overlapping storage areas. Using variables in this manner corresponds to using the variable as left-hand value (L-value) in C++ language.
(3) A reference text including an equation for referring to the values of variables in overlapping storage areas. Using variables in this manner corresponds to using the variable as right-hand value (R-value) in C++ language.
(4) A registration text for registering the values of variables in overlapping storage areas to a database.
(5) A readout text for reading the values of variables in overlapping storage areas from a database.
(6) A normal text that does not use variables in overlapping storage areas.

It should be noted that, in the above assignment text, the assigned values may include an equation that is referred to.

These texts are compiled by a declaration translation unit 104, an assignment translation unit 105, a registration translation unit 107, a readout translation unit 108, and a normal 30 translation unit 109, respectively.

Also, a reference translation unit 106 compiles "an equation for referring to the values of variables in overlapping storage areas" in a reference text. Thus, if "an equation for referring to the values of variables in overlapping storage areas" is used as a value to be assigned in an assignment text, the assignment translation unit 105 let the reference translation unit 106 compile the equation and uses the outcome.

The translated texts are combined by a combining unit 110 to form the translated program.

The details of processings in the lexical analysis unit 102, syntax analysis unit 103, normal translation unit 109, and combining unit 110 can be applied publicly known techniques used for a variety of compilers and translators. The following describes further details of the features of the declaration translation unit 104, assignment translation unit 105, reference translation unit 106, registration translation unit 107, and readout translation unit 108.

(Declaration Translation Unit)

The declaration translation unit 104 compiles a declaration of variables allocated to overlapping storage areas in COBOL language to a declaration in JAVA (registered trademark).

For example, in the above example, a declaration that an integer variable expressed by zoned binary coded decimal YI and a character array variable YS are overlappingly allocated to the same storage area as redefined fields. For ease of understanding, the following describes an example of a method for compiling these variables.

The declaration translation unit 104 compiles such variables in overlapping storage areas to declarations such as the ones described below:

(a) A declaration of JAVA (registered trademark) variable for storing each COBOL variable. For example, suppose vi and vs are declared as JAVA (registered trademark) variables for recording values stored in COBOL variables yi and ys. Hereafter, these variables are referred to as data variables. The types of vi and vs are required to be precise enough to record information that can be stored in YI and YS.

(b) A declaration of JAVA (registered trademark) variable that, when accessing each COBOL variable, shows whether or not the variable is valid. For example, suppose fi and fs are JAVA (registered trademark) variables to record the values stored in COBOL variables yi and ys. Hereafter, these variables are referred to as flag variables. While, typically, the types of fi and fs are boolean type that records true or false values, techniques such as a bit array or a bit field may also be used. The default values of fi and fs are typically set to "false".

(c) Definitions of a setter method and a getter method for the JAVA (registered trademark) variable. The setter method is a method included in the outcome after translating an assignment text. The getter method is a method included in the outcome after translating a reference equation. Methods for vi and vs respectively have the following signatures:

void setVI(Object value);

void setVS(Object value);

Object getVI( ) throws CobolException;

Object getVS( ) throws CobolException;

It should be noted that, instead of the Object type, other types including a user-defined class for storing values of COBOL language, an embedded type, such as int type and long type, and an embedded class, such as String type, may also be used. Details of the content of the method output as the result of compilation by the declaration translation unit 104 are described later.

(Assignment Translation Unit)

The assignment translation unit 105 translates an assignment text of variables allocated to overlapping storage areas. Thus, the translation is performed as follows:

(1) First, translating 'an equation that expresses a value to be assigned to a variable' in COBOL language into a JAVA (registered trademark) language program.

(2) Next, translating into a JAVA (registered trademark) language program in which the value obtained by executing the above translation is given as a parameter to invoke a setter method so that the value is assigned to the variable.

General techniques for compilers/translators can be utilized to translate the equation, provided, however, translation of equations that refer to 'variables allocated to overlapping storage areas' is left to the reference translation unit 106 that is described later.

Figure 2:
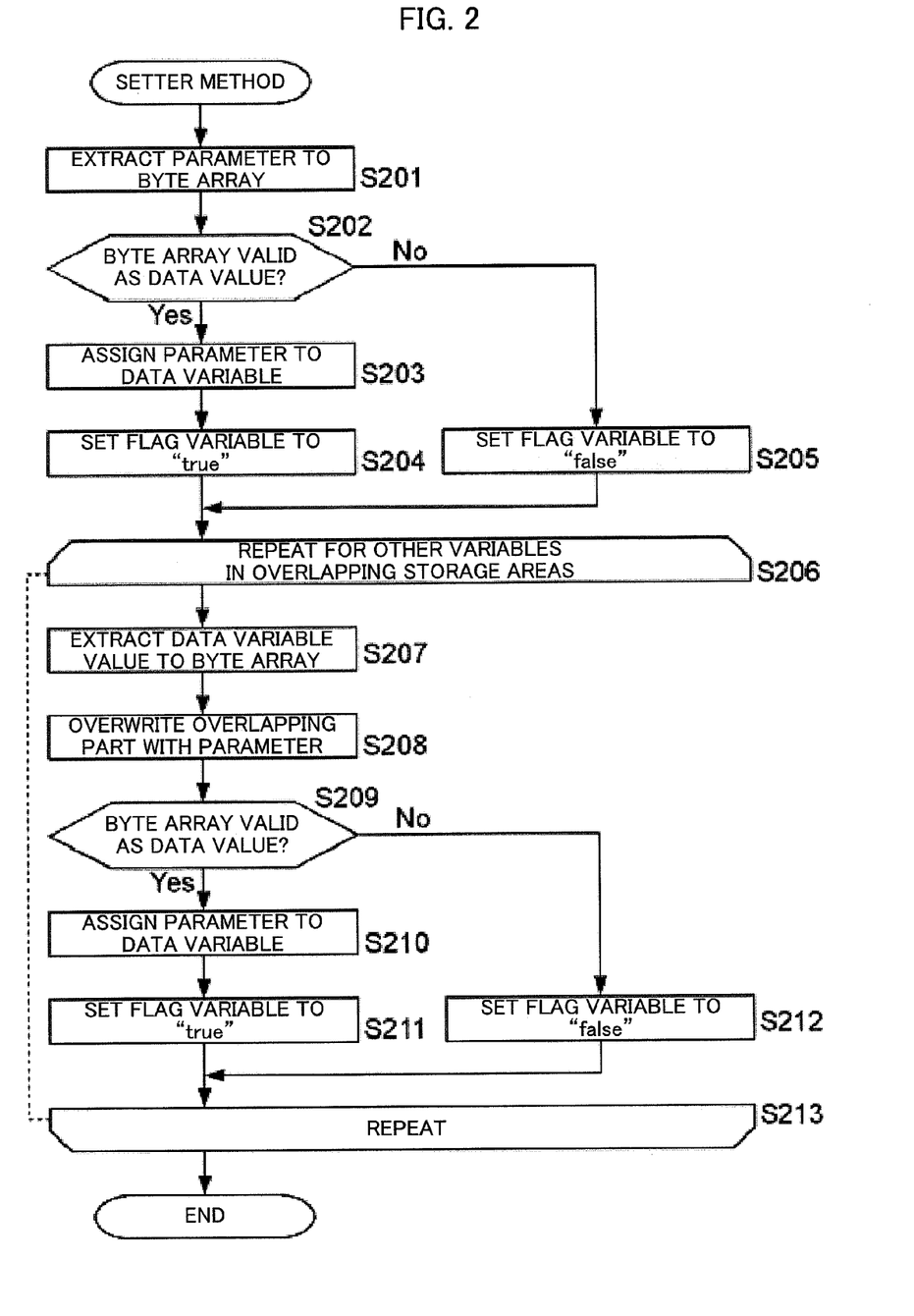
FIG. 2 is a flowchart showing the flow of control of processing executed by the setter method.

The following describes what kinds of processings are performed by the setter method when running the JAVA (registered trademark) language program.

FIG. 2 is a flowchart showing the flow of control of processing executed by a setter method. The following is described with reference to FIG. 2.

The processing begins when a setter method is invoked by giving a value to be assigned as a parameter. The setter method, first, extracts the given parameter to a byte array (step S201).

For example, when the parameter is arg, in order to extract this parameter to a byte array bs, the CPU invokes a method as follows:

bs=CobolExtractToByteSequence(arg);

Next, the CPU checks whether or not the byte array extracted from the parameter is valid as a value of a data variable for the setter method (step S202).

In the above example, the CPU checks whether or not the byte array bs is valid as a value of data variable vs, that is, whether or not the byte array is valid enough for a character array of COBOL.

As the result, if the byte array is determined as valid (step S202; Yes), the CPU assigns the parameter to the corresponding data variable (step S203), and sets the flag variable to "true" (step S204). For example, if the parameter is arg and the setter method is setVS( ), the following equations are performed:

vs=arg;

fs=true;

On the other hand, if the byte array is determined as invalid (step S202; No), the CPU assigns "false" to the flag variable (step S205).

In the above example, for example, assignment is performed as follows:

fs=false;

Next, the following processing is performed to all the variables allocated to overlapping storage areas among the COBOL variables corresponding to the setter method (steps S206-S213). In this example, as the COBOL variable YI is allocated by overlapping the COBOL variable YS, the following processing is performed to the COBOL variable YI.

The CPU, first, extracts the value recorded in the data variable at this point to a memory image of a byte array (step S207).

In this example, YI is extracted to a byte array cs as in the following equation:

cs=CobolExtractToByteSequence(yi);

Then, the CPU overwrites with byte values recorded in the overlapping area among the byte array bs extracted from the parameter over the overlapping area among the byte array cs extracted from data variable (step S208).

In this example, as YS and YI are of the same size, the sizes of the extracted byte arrays become the same, and, thus, the whole data should be overwritten.

It should be noted that, if only part of the storage area is overlapping, only part of the byte array area extracted from the data variable may become the transferring destination or only part of the byte array area extracted from the parameter may become the transferring source.

In addition, if it becomes clear to overwrite the whole data at translation, extraction of the value recorded in the data variable may be skipped at step S207.

Subsequently, the CPU determines whether or not the overwritten byte array is valid as a byte array expressing the value of the original data variable (step S209).

If it is invalid (step S209; No), the CPU assigns "false" to the flag variable (step S212). In this example, the following equation is executed:

fi=false;

On the other hand, if it is valid (step S209; Yes), the CPU generates a value expressed by the byte array, assigns the value to the original data variable (step S210), and assigns "true" to the flag variable (step S211). In this example, the processing such as below is performed:

vi=CobolDeExtractFromByteSequence(cs);

fi=true;

Thereafter, the CPU repeats the loop for all the COBOL variables in overlapping storage areas (step S213). When the loop ends, the CPU terminates the setter method.

It should be noted that, while, typically, for CobolExtractToByteSequence( ) that extracts the value stored in a data variable to a byte array or CobolDeExtractFromByteSequence( ) that performs the reverse processing, a parameter representing the type of the data variable is added or a different method is invoked according to each type of the data variable, the details of which are not described here for ease of understanding.

In this way, by translating the assignment text in COBOL program into the one in JAVA (registered trademark) program, the text can be prepared to be referred to by the equation described later.

(Reference Translation Unit)

The reference translation unit 106 translates 'an equation that refers to the values of variables allocated to overlapping storage areas' and 'a text that includes an equation that refers to the values of variables allocated to overlapping storage areas.'

In 'an equation that refers to the values of a variables' of a typical programming language, identifiers of such variables are used as 'right-hand value.'

The reference translation unit 106 compiles these COBOL variables to invocation of getter methods for the data variables.

Figure 3:
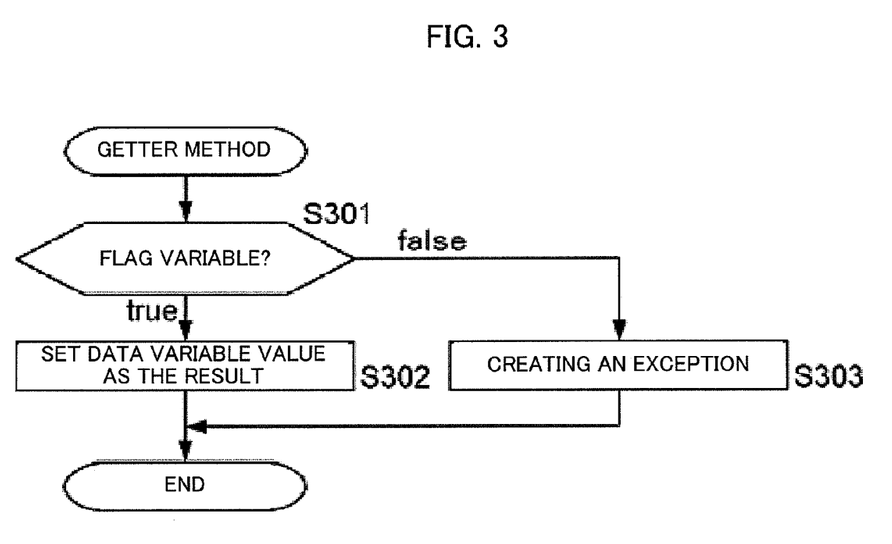
FIG. 3 is a flowchart showing the flow of control of processing executed by the getter method.

The following describes what kinds of processings are performed by the getter method when running the JAVA (registered trademark) language program.

FIG. 3 is a flowchart showing the flow of control of processing executed by a getter method. The following is described with reference to FIG. 3.

When a getter method for a certain COBOL variable is invoked, the CPU, first, determines whether the value of the flag variable corresponding to the COBOL variable is "true" or "false" (step S301).

For example, for the equation that refers to the COBOL variable YI, the flag variable fi becomes a subject to be determined.

If the value of the flag variable is "true" (step S302; true), as the value of the corresponding data variable is considered valid, the CPU terminates the processing by setting the value of the data variable as the result of the equation (step S303). In the above example, this is equivalent to the following equation:

return vi;

On the other hand, if the value of the flag variable fi is "false" (step S302; false), the value of the corresponding data variable is considered invalid. Then, the CPU creates (throws) an exception in line with the operation in COBOL language (step S304), and terminates this processing. In the above example, this is equivalent to executing the following equation:

throw (new CobolException);

Here, CobolException is for simulating an exception created when running COBOL language. It is possible to capture the exception using try . . . catch . . . finally . . . syntax in JAVA (registered trademark) language.

That is, exception handlings described in COBOL language are compiled to try . . . catch . . . finally . . . syntax in JAVA (registered trademark) language.

It should be noted that when translating COBOL language program into C language or C++ language, a technique similar to the above one for JAVA (registered trademark) language can be used, instead of using union. While, since C++ language has an exception handling feature, translation into C++ language can be performed similarly to the case of JAVA (registered trademark) language, C language does not have an exception handling feature.

Thus, in C language, it is possible to realize a global exit based on an exception handling by using setjmp( ) function, instead of try, and longjmp( ) function, instead of throw, respectively.

(Registration Translation Unit and Readout Translation Unit)

If redefined fields, that is, variables allocated to overlapping storage areas are part of a record to be registered to a database, only the variable declared first is registered to and read out from the database in an implementation of COBOL language.

In such an implementation, the resulting JAVA (registered trademark) program after translating the registration text for registering to the database performs the following processing:
(a) if the flag variable corresponding to the COBOL variable that is declared first, is "true", the value of the data variable is written to the database; and
(b) if the flag variable is "false", a NIL value indicating that the value does not exist is written to the database.

Meanwhile, the resulting JAVA (registered trademark) program after translating the readout text for reading from the database performs the following processing:
(a) if the value read out from the database is a NIL value, the flag variable is set to "false";
(b) if the value read out from the database is not a NIL value, the flag variable is set to "true" and the readout value is assigned to the data variable.

Also, in another embodiment in which each variable allocated to an overlapping storage area is registered to and read out from a database one at a time, translation into a JAVA (registered trademark) program may be performed in a manner so that the above processing is repeated for each COBOL variable.

In this way, by automatically converting a program that is described in COBOL language and uses a database to a JAVA (registered trademark) language program that performs equivalent features, the program can be adapted to the latest computer environment and a tremendous volume of program assets from the past can be utilized.

It should be noted that this application claims a priority based on Japanese Patent Application No. 2009-075783, and the whole description, claims, and drawings of Japanese Patent Application No. 2009-075783 are included herein by reference.

INDUSTRIAL APPLICABILITY

As described above, according to the invention, there can be provided a translation device, translation method, and storage medium suitable for translating a program described in a first programming language that can describe overlapping storage areas for retaining variables into a program described in a second programming language while resolving the overlapping storage areas.

EXPLANATION OF SYMBOLS

101 TRANSLATION DEVICE
102 LEXICAL ANALYSIS UNIT
103 SYNTAX ANALYSIS UNIT
104 DECLARATION TRANSLATION UNIT
105 ASSIGNMENT TRANSLATION UNIT
106 REFERENCE TRANSLATION UNIT
107 REGISTRATION TRANSLATION UNIT
108 READOUT TRANSLATION UNIT
109 NORMAL TRANSLATION UNIT
110 COMBINING UNIT

The invention claimed is:

1. A translation device that translates an untranslated program described in a first programming language into a translated program described in a second programming language, comprising: a declaration translation unit that translates a declaration that a storage area for retaining a first untranslated variable and a storage area for retaining a second untranslated variable overlap in the untranslated program into a declaration that a first translated variable and a first translated flag corresponding to the first untranslated variable and a second translated variable, and a second translated flag corresponding to the second untranslated variable are retained in storage areas that do not mutually overlapin the translated program; an assignment translation unit that translates text that assigns a value to the first untranslated variable in the untranslated program into text that assigns the value to the first translated variable, writes information to be recorded in an overlapping storage area among the assigned value in a storage area corresponding to the overlapping storage area among the storage area for retaining the second translated variable, and writes in the second translated flag, whether or not the information recorded in the storage area for retaining the second translated variable is valid as a value of the second translated variable in the translated program, and translates text that assigns a value to the second untranslated variable in the untranslated program into text that assigns the value into the second translated variable, writes information to be recorded in the overlapping storage area among the assigned value in the storage area corresponding to the overlapping storage area among the storage area for retaining the first translated variable, and writes in the first translated flag, whether or not the information recorded in the storage area for retaining the first translated variable is valid as a value of the first translated variable in the translated program; and a reference translation unit that translates an equation that refers to a value of the first untranslated variable in the untranslated program into an equation that determines whether or not the information recorded in the storage area for retaining the first translated variable is valid as a value of the first translated variable by referring to the first translated flag, and referring to the value of the first translated variable when determined as valid, and creating an exception when determined as invalid in the translated program, and translates an equation that refers to a value of the second untranslated variable in the untranslated program into an equation that determines whether or not the information recorded in the storage area for retaining the second translated variable is valid as a value of the second translated variable by referring to the second translated flag, and referring to the value of the second translated variable when determined as valid, and creating an exception when determined as invalid in the translated program.

2. The translation device according to claim 1 further comprising: a registration translation unit that translates text that registers a value of the first untranslated variable to a database in the untranslated program into text that determines whether or not information recorded in a storage area for retaining the first translated variable is valid as a value of the first translated variable by referring to the first translated flag, and registering the value of the first translated variable to the database when determined as valid, and registering a NIL value to the database when determined as invalid in the translated program, and translates text that registers a value of the second untranslated variable to the database in the untranslated program into text that determines whether or not the information recorded in a storage area for retaining the second translated variable is valid as a value of the second translated variable by referring to the second translated flag, and registering the value of the second translated variable to the database when determined as valid, and registering the NIL value to the database when determined as invalid in the translated program; and a readout translation unit that translates text that assigns a value read out from a database into the first untranslated variable in the untranslated program into text that reads out a value from the database, writes that the information recorded in the storage area for retaining the first translated variable is invalid in the first translated flag when the read out value is the NIL value, writes that the information recorded in the storage area for retaining the first translated variable is valid in the first translated flag when the read out value is not the NIL value, and writes the read out value in the storage area for retaining the first translated variable in the translated program, and translates text that assigns a value read out from a database to the second untranslated variable in the untranslated program into text that reads out a value from the database, writing that the information recorded in a storage area for retaining the second translated variable is invalid in the second translated flag when the read value is the NIL value, writes that the information recorded in the storage area for retaining the second translated variable is valid in the second translated flag when the read value is not the NIL value, and writes the read out value in the storage area for retaining the second translated variable in the translated program.

3. The translation device according to claim 2 wherein, the first untranslated variable is a zoned binary coded decimal, the second untranslated variable is an integer other than the zoned binary coded decimal, the first translated variable is an integer capable of expressing an integer domain which can include the first untranslated variable, and the second translated variable is an integer capable of expressing an integer domain which can include the second untranslated variable.

4. The translation device according to claim 2 wherein the first untranslated variable is a zoned binary coded decimal, the second untranslated variable is a character array, the first translated variable is an integer capable of expressing an integer domain which can include the first untranslated variable, and the second translated variable is a character array of the second untranslated variable.

5. A translation method carried out by a translation device that translates an untranslated program described in a first programming language into a translated program described in a second programming language, the translation device including a declaration translation unit, an assignment translation unit, and a reference translation unit, the translation method comprising: a declaration translation step in which the declaration translation unit translates a declaration that a storage area for retaining a first untranslated variable and a storage area for retaining a second untranslated variable overlap in the untranslated program into a declaration that a first translated variable and a first translated flag corresponding to the first untranslated variable and a second translated variable and a second translated flag corresponding to the second untranslated variable are retained in storage areas that do not mutually overlap in the translated program; an assignment translation step in which the assignment translation unit translates text that assigns a value to the first untranslated variable in the untranslated program into text that assigns the value to the first translated variable, writes information to be recorded in an overlapping storage area among the assigned value in a storage area corresponding to the overlapping storage area among the storage area for retaining the second translated variable, writes in the second translated flag, whether or not the information recorded in the storage area for retaining the second translated variable is valid as a value of the second translated variable in the translated program, and translates text that assigns a value to the second untranslated variable in the untranslated program into text that assigns the value into the second translated variable, writes information to be recorded in the overlapping storage area among the assigned value in the storage area corresponding to the overlapping storage area among the storage area for retaining the first translated variable, and writes in the first translated flag, whether or not the information recorded in the storage area for retaining the first translated variable is valid as a value of the first translated variable in the translated program; and a reference translation step in which the reference translation unit translates an equation that refers to a value of the first untranslated variable in the untranslated program into an equation that determines whether or not the information recorded in the storage area for retaining the first translated variable is valid as a value of the first translated variable by referring to the first translated flag, and referring to the value of the first translated variable when determined as valid, and creating an exception when determined as invalid in the translated program and translates an equation that refers to a value of the second untranslated variable in the untranslated program into an equation that determines whether or not the information recorded in the storage area for retaining the second translated variable is valid as a value of the second translated variable by referring to the second translated flag, and referring to the value of the second translated variable when determined as valid, and creating an exception when determined as invalid in the translated program.

6. A non-transitory computer-readable storage medium that records a program for translating an untranslated program described in a first programming language into a translated program described in a second programming language in a computer, the program causing the computer to function as: a declaration translation unit that translates a declaration that a storage area for retaining a first untranslated variable and a storage area for retaining a second untranslated variable overlap in the untranslated program into a declaration that a first translated variable and a first translated flag corresponding to the first untranslated variable and a second translated variable and a second translated flag corresponding to the second untranslated variable are retained in storage areas that do not mutually overlap in the translated program; an assignment translation unit that translates text that assigns a value to the first untranslated variable in the untranslated program into text that assigns the value to the first translated variable, writes information to be recorded in an overlapping storage area among the assigned value in a storage area corresponding to the overlapping storage area among the storage area for retaining the second translated variable, and writes in the second translated flag, whether or not the information recorded in the storage area for retaining the second translated variable is valid as a value of the second translated variable in the translated program, and translates text that assigns a value to the second untranslated variable in the untranslated program into text that assigns the value into the second translated variable, writes information to be recorded in the overlapping storage area among the assigned value in the storage area corresponding to the overlapping storage area among the storage area for retaining the first translated variable, and writes in the first translated flag, whether or not the information recorded in the storage area for retaining the first translated variable is valid as a value of the first translated variable in the translated program; and a reference translation unit that translates an equation that refers to a value of the first untranslated variable in the untranslated program into an equation that determines whether or not the information recorded in the storage area for retaining the first translated variable is valid as a value of the first translated variable by referring to the first translated flag, and referring to the value of the first translated variable when determined as valid, and creating an exception when determined as invalid in the translated program, and translates an equation that refers to a value of the second untranslated variable in the untranslated program into an equation that determines whether or not the information recorded in the storage area for retaining the second translated variable is valid as a value of the second translated variable by referring to the second translated flag, and referring to the value of the second translated variable when determined as valid, and creating an exception when determined as invalid in the translated program.

* * * * *

UNITED STATES PATENT AND TRADEMARK OFFICE
CERTIFICATE OF CORRECTION

| | | |
|---|---|---|
| PATENT NO. | : 8,527,968 B2 | Page 1 of 1 |
| APPLICATION NO. | : 13/259914 | |
| DATED | : September 3, 2013 | |
| INVENTOR(S) | : Jun Eguchi | |

It is certified that error appears in the above-identified patent and that said Letters Patent is hereby corrected as shown below:

In the Specification

Column 2, Line 1: Delete "Coversions" and insert -- Conversions --

Column 2, Line 14-15: Delete "50÷48×256=12338," and insert -- 50+48×256=12338, --

Column 7, Line 57: After "normal" delete "30"

In the Claims

Column 12, Line 43: In Claim 1, delete "overlapin" and insert -- overlap in --

Signed and Sealed this
Fourth Day of November, 2014

Michelle K. Lee
*Deputy Director of the United States Patent and Trademark Office*